United States Patent
Broll et al.

(10) Patent No.: US 10,713,505 B2
(45) Date of Patent: Jul. 14, 2020

(54) METHOD FOR MONITORING THE VEHICLE SURROUNDINGS OF A VEHICLE COMBINATION AND MONITORING SYSTEM

(71) Applicant: WABCO Europe BVBA, Brussels (BE)

(72) Inventors: Niklas Broll, Ronnenberg (DE); Soeren Huebner, Varel (DE); Thomas Wolf, Barsinghausen (DE)

(73) Assignee: WABCO EUROPE BVBA, Brussels (BE)

( * ) Notice: Subject to any disclaimer, the term of this patent is extended or adjusted under 35 U.S.C. 154(b) by 0 days.

(21) Appl. No.: 16/466,301

(22) PCT Filed: Nov. 29, 2017

(86) PCT No.: PCT/EP2017/080819
§ 371 (c)(1),
(2) Date: Jun. 4, 2019

(87) PCT Pub. No.: WO2018/108532
PCT Pub. Date: Jun. 21, 2018

(65) Prior Publication Data
US 2019/0325233 A1    Oct. 24, 2019

(30) Foreign Application Priority Data

Dec. 17, 2016   (DE) .......................... 10 2016 015 363

(51) Int. Cl.
*G08B 21/00* (2006.01)
*G06K 9/00* (2006.01)
(Continued)

(52) U.S. Cl.
CPC .......... *G06K 9/00791* (2013.01); *B60R 11/04* (2013.01); *G08G 1/167* (2013.01);
(Continued)

(58) Field of Classification Search
CPC ................ G06K 9/00791; B62D 13/06; B62D 15/0295; B62D 15/0275; B60R 1/00; B60R 11/04; B60W 30/09
See application file for complete search history.

(56) References Cited

U.S. PATENT DOCUMENTS

| 9,527,528 B1* | 12/2016 | Harrison ............ B62D 15/0265 |
| 2014/0160276 A1* | 6/2014 | Pliefke ...................... B60R 1/00 348/118 |
| 2017/0050672 A1* | 2/2017 | Gieseke ................. B62D 13/06 |

FOREIGN PATENT DOCUMENTS

| DE | 29818214 U1 | 2/2000 |
| DE | 10351655 A1 | 6/2005 |

(Continued)

*Primary Examiner* — Toan N Pham
(74) *Attorney, Agent, or Firm* — Leydig, Voit & Mayer, Ltd.

(57) ABSTRACT

The invention relates to a method for monitoring the vehicle surroundings (U) of a vehicle combination (1), in particular utility vehicle combination (1), composed of a traction vehicle (2) and at least one trailer (3) using a monitoring system with a camera (11), having at least the following steps:—defining a monitoring space (13) within a capture range (12) of the camera (11), wherein the monitoring system monitors only the monitoring space (13) for critical objects which can give rise to a collision probability, wherein the monitoring space (13) is defined and oriented in such a way that the vehicle surroundings (U) are located at least partially in the monitoring space (13), and at the same time the vehicle combination (1) is not located in the monitoring space (13), wherein for this purpose—a variable ($\delta$, $\omega$) which characterizes the orientation between the traction vehicle (2) and the trailer (3) is acquired; and—a manipulated variable ($\beta$) is determined as a function thereof, with which method the monitoring space (13) is shifted within the capture range (12) and therefore adapted dynami- (Continued)

cally; and—detecting whether critical objects are located in the monitoring space (13), in order to avoid a collision between an object which presents a risk and is located in the monitored vehicle surroundings (U) and the vehicle combination (1) in question.

13 Claims, 2 Drawing Sheets

(51) Int. Cl.
  *B60R 11/04* (2006.01)
  *G08G 1/16* (2006.01)
(52) U.S. Cl.
  CPC ... *B60R 2300/101* (2013.01); *B60R 2300/802* (2013.01); *B60R 2300/8086* (2013.01)

(56) References Cited

FOREIGN PATENT DOCUMENTS

| | | |
|---|---|---|
| DE | 102005044500 A1 | 3/2007 |
| DE | 102005044485 A1 | 4/2007 |
| DE | 102006026898 A1 | 12/2007 |
| DE | 102010048144 A1 | 7/2011 |
| DE | 102010032411 A1 | 2/2012 |
| DE | 102011116822 A1 | 4/2013 |
| EP | 1114750 A2 | 7/2001 |
| EP | 1245445 B1 | 8/2005 |
| EP | 2786347 B1 | 9/2016 |
| JP | 2002181518 A | 6/2002 |

\* cited by examiner

METHOD FOR MONITORING THE VEHICLE SURROUNDINGS OF A VEHICLE COMBINATION AND MONITORING SYSTEM

CROSS REFERENCE TO RELATED APPLICATIONS

This application is a U.S. National Stage Application under 35 U.S.C. § 371 of International Application No. PCT/EP2017/080819 filed on Nov. 29, 2017, and claims benefit to German Patent Application No. DE 10 2016 015 363.6 filed on Dec. 17, 2016. The International Application was published in German on Jun. 21, 2018, as WO 2018/108532 A1 under PCT Article 21(2).

FIELD

The invention relates to a method for monitoring a vehicle environment of a vehicle combination, in particular of a commercial vehicle combination, and also a monitoring system for implementing such a method.

BACKGROUND

It is known to use monitoring systems having a sensor system in vehicles, in particular commercial vehicles, in order to be able to monitor the vehicle environment for objects. Radar sensors, ultrasonic sensors, cameras or the like are by way of example considered as sensor systems. The signals of the sensor systems are processed and by way of example used for the purpose of identifying an object that is approaching adjacent to or in front of the vehicle and to output a warning signal to the driver when such an object is identified, in particular if a risk is created by said object. It is possible using such a monitoring system to warn the driver by way of example about objects in a so-called "blind spot" in the vehicle environment since this "blind spot" may normally not be seen by means of the side mirror and the driver also cannot directly see said blind spot while driving. Furthermore, a warning signal may consequently be output if the driver is concentrating on other parts of the vehicle environment by way of example while negotiating a bend or when making a turn.

The region in which such a monitoring procedure by means of the monitoring system takes place is in particular specified by virtue of a monitoring area when a camera is used. The monitoring area is a part region of a possible detection region of the camera or the sensor system; the monitoring area is also referred to as the "region of interest" ROI. If the environment to the side of the vehicle is to be monitored, this monitoring area is accordingly oriented to this region to the side of the vehicle with the result that potentially critical objects which may create a risk or a probability of collision may be detected.

DE 298 18 214 U1 discloses a monitoring system of this type having a camera on a commercial vehicle combination in which the detection region and consequently also the monitoring area of the camera is changed in dependence upon a turning angle or steering angle. For this purpose, the camera is moved or rotated by means of an automated tracking system in dependence upon the steering angle. It is hereby to be achieved that using the monitoring system even when making a turn the trailer of the commercial vehicle combination may be detected and monitored in its entire length as well as the traffic that is running parallel to the trailer in the environment to the side of the vehicle.

DE 10 2006 026 898 A1 or EP 1 245 445 B1 also disclose a monitoring system in which at least one camera of the monitoring system may be adjusted in dependence upon a pivot position or an articulation angle of the towing vehicle with respect to the trailer with the result that as large as possible a region in the environment to the side of the vehicle, in particular in the region of the trailer, may be displayed by means of a corresponding orientation of the camera. U.S. Pat. No. 3,689,695 describes a further adjustable camera system of this type for a commercial vehicle combination.

DE 103 51 655 A1 describes a method in which a position and/or the tractrix curve of a trailed axis of a trailer may be computationally determined while negotiating a bend in particular in dependence upon a steering angle that is detected. In dependence upon said position and/or tractrix curve a viewing angle or detection region of a camera of the monitoring system may be changed in such a manner that the trailed axis or the travel path of the trailed axis may be detected by the monitoring system and may be displayed for the driver and as a consequence the driver may reliably identify obstacles that stand in the way. The detection region is changed in this case by means of displacing or pivoting the camera.

In this case, the disadvantage is that a change in the orientation of the detection region or the monitoring area of the camera is only provided by means of a mechanical adjustment of the camera or the sensor system. As a consequence, a large constructive outlay is required and also retrofitting vehicles with such a system is only possible in a particularly complex manner.

DE 10 2011 116 822 A1 describes for this purpose a monitoring system having ultrasonic sensors in which a warning region or monitoring area which may be adjusted is specified within a detection region of the ultrasonic sensors, said warning region or monitoring area being in particular in the side region of the vehicle environment. Only objects that enter into the monitoring area trigger a warning signal. The monitoring area is adjusted in dependence upon the traffic situation. The width of the monitoring area is thus increased to the maximum extent within the detection region when it is identified that a turn is being made with the result that people, cyclists or the like may be reliably detected. The adjustment may also be performed by way of example in dependence upon the steering angle. Conversely, at high speeds the side monitoring area is limited to a minimum side monitoring area with the result that unnecessary warning signals are not caused by means of for example marking posts, crash barriers or the like in the region to the side of the vehicle.

SUMMARY

In an embodiment, the present invention provides a method for monitoring, using a monitoring system having a camera, a vehicle environment of a vehicle combination including a towing vehicle and a trailer. The method includes specifying a monitoring area within a detection region of the camera, wherein the monitoring system only monitors the monitoring area for critical objects that may create a probability of collision, and wherein the monitoring area is specified and oriented in such a manner that the vehicle environment is at least in regions in the monitoring area and simultaneously the vehicle combination is not in the monitoring area. The method further includes determining a variable that characterizes an orientation between the towing vehicle and the trailer, determining an adjustment variable in dependence upon the variable that characterizes the orientation between the towing vehicle and the trailer, and displacing and therefore dynamically adjusting the monitoring area within the detection region using the adjustment variable. In addition, the method includes specifying whether critical objects are in the monitoring area so as to avoid a collision between a hazardous object that is in the vehicle environment that is being monitored and the associated vehicle combination.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
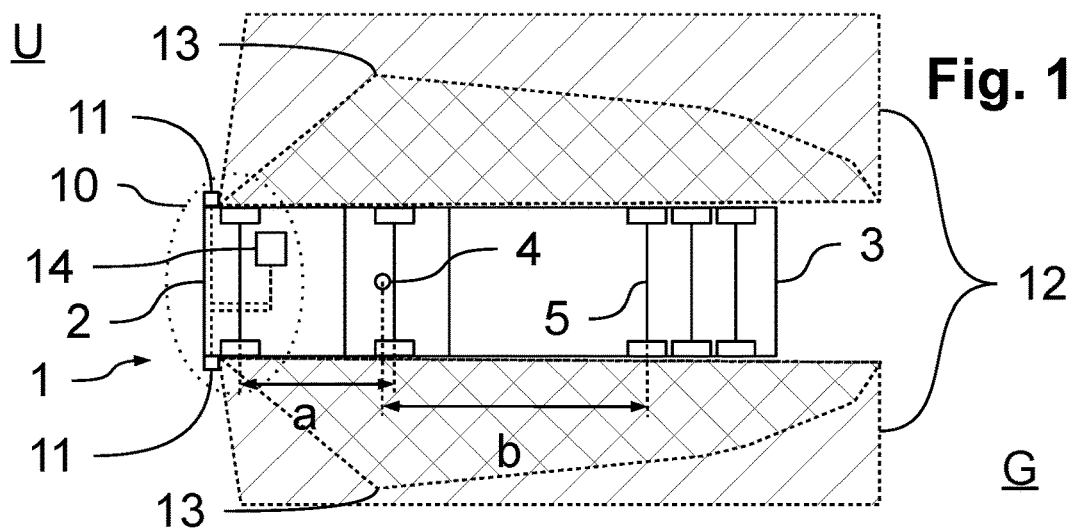
FIG. 1 illustrates a commercial vehicle combination having a monitoring system while driving in a straight line.

The disadvantage in the case of all the mentioned prior art monitoring systems is that as soon as the associated vehicle, in particular the associated trailer of the vehicle combination, enters the monitoring area of the camera when making a turn or negotiating a bend, it is possible for the trailer to trigger a warning since the associated trailer may be identified by the monitoring system as a possible collision object as a result of entering the monitoring area if a specific dynamic behavior is specified for the trailer by the monitoring system.

It is only possible to differentiate between whether it is the associated trailer or a cyclist or another vehicle by means of an additional procedure of filtering data of the camera, said procedure of filtering data however being particularly complex and also susceptible to error. If such a filtering procedure is not performed, in specific driving situations it is possible for a warning signal to be sent in error to the driver owing to the trailer. After a plurality of such erroneous warnings, the acceptance of the driver for the monitoring system reduces and further—also important—warnings from the monitoring system will be ignored.

Embodiments of the invention provide a method for monitoring a vehicle environment of a vehicle combination, in particular a commercial vehicle combination and using said method it is possible with little outlay to avoid unnecessary warning signals. Furthermore, embodiments of the invention provide a monitoring system for implementing such a method.

In accordance with the invention, it is accordingly provided in a monitoring system to specify a monitoring area of a camera as a part region of a detection region of the camera in such a manner that a vehicle environment is at least in regions in the monitoring area and simultaneously the associated vehicle combination, in particular commercial vehicle combination, is not in the monitoring area. For this purpose, in accordance with the invention a variable that characterizes the orientation between a towing vehicle and a trailer of the vehicle combination is determined and an adjustment variable is determined in dependence upon this determined variable, said adjustment variable preferably being a rotation angle, about which the monitoring area is displaced or rotated within the detection region.

Within the scope of the invention, the region in which the camera may theoretically detect objects in the vehicle environment is understood as the detection region of the camera. The dimensions of this detection region are in particular specified by means of the lens of the camera, which is used. The orientation of the detection region relative to the vehicle combination is performed by means of accordingly fastening the camera to a fastening point on the towing vehicle, for example on the side mirror or a fastening point on the trailer, wherein the camera is preferably installed at this fastening point in a non-rotatable manner.

Conversely, the monitoring area is a part region of this detection region and indicates for which region the camera is actually outputting data for further processing by way of example to a control device of the monitoring system. Thus, when using cameras, specific edge regions may be excluded for further processing, in other words the detection region is not entirely utilized in all circumstances for the purpose of monitoring in order for example to exclude regions that are not required.

The relative position of the monitoring area within the detection region may thus be dynamically adjusted by means of the approach in accordance with the invention to the steering situation that is currently being performed by the vehicle combination. If the orientation between the towing vehicle and the trailer changes accordingly by means of a steering movement that is currently being implemented, for example while negotiating a bend or when making a turn, this is detected and the monitoring area is dynamically adjusted to this. The dynamic adjustment in this case occurs proportionally counter to the requested steering movement or the turning angle in order to compensate the rotation of the fixedly installed camera owing to the steering movement.

It is hereby advantageously achieved that the associated vehicle combination may be excluded in a simple manner from the monitoring region in the respective traffic situation, in other words the associated vehicle combination is no longer taken into account by the image processing procedure in the monitoring system. Accordingly, it is possible to avoid the associated vehicle combination itself being classified by the monitoring system as a critical object, said monitoring system monitoring the monitoring area for potentially critical objects that may create a risk or a probability of collision. A complex filtering procedure may accordingly be omitted in that this region is not taken into account and accordingly is not to be processed. It is preferred that the monitoring area in this case is oriented to the vehicle environment to the side of the associated vehicle combination in order to monitor in particular this region of the vehicle environment.

In accordance with the invention, it is consequently identified that by means of this dynamic displacement or rotation of the monitoring area it is possible to avoid a warning message that is output in error as a consequence of identifying by way of example the associated trailer while negotiating a bend; the acceptance for the monitoring system increases. Moreover, by means of the dynamic displacement or rotation in dependence upon the orientation, the monitoring area is changed back to the actually interesting region of the vehicle environment in the direction parallel to the starting traffic lane or the region that is monitored while traveling in a straight line.

The dynamic adjustment of the monitoring area is advantageously performed using software on the control device of the monitoring system. In other words, an adjustment of the camera itself with respect to the fastening point is not necessary in order to react to the change in the orientation between the towing vehicle and the trailer and to compensate for this change. As a consequence, a simple opportunity to retrofit vehicles is provided and the assembly and cost outlay is minimal.

Within the scope of the invention, objects that may create a probability of collision with the associated vehicle combination are understood to be critical objects for which the vehicle environment in the monitoring area is monitored by the monitoring system. This may be determined by way of example in that the movement of an object in the monitoring area is compared to the movement of the associated vehicle combination, wherein for this purpose by way of example predicted trajectories for the object that is identified and the vehicle combination are created and compared. If intersections occur, a probability of collision may be determined and the driver may be accordingly warned via a warning notification with the result that said driver may still react in order to avoid a collision. Where appropriate, an automated braking procedure or further automated measures may also be introduced.

The monitoring system is consequently used for the purpose of monitoring the driving activities in the prevailing traffic situation, in particular while negotiating a bend or making a turn or an overtaking maneuver and to assist the driver since it is also possible for the monitoring system to cover regions of the vehicle environment that the driver may not be able to see or in certain circumstances the driver is not paying attention to. This assistance may be provided in a reliable manner and with a high degree of acceptance by the driver by means of the displacement or rotation of the monitoring area.

It is preferred that the variable that characterizes the orientation between the towing vehicle and the trailer is measured as a steering angle, wherein the steering angle indicates how intensely the towing vehicle is currently deflected. In addition, a trailer steering arrangement that is possibly provided may also be taken into account. Advantageously, a simple variable that characterizes the orientation may consequently be used so as to evaluate the prevailing steering situation and so as to displace or rotate the monitoring area, wherein the monitoring area is then dynamically displaced or rotated proportionally counter to this steering angle.

Alternatively, the variable that characterizes the orientation between the towing vehicle and the trailer may be a steering wheel angle for which in addition an angle scale factor is taken into account in order to obtain the actually implemented steering effect. A simple variable that characterizes the orientation may also be drawn upon so as to evaluate the prevailing steering situation and so as to displace or rotate the monitoring area.

In accordance with a further alternative an articulation angle between the towing vehicle and the trailer may be used as the variable that characterizes the orientation between the towing vehicle and the trailer. Advantageously, as a consequence an actual orientation between the trailer and the towing vehicle is provided and the adjustment variable, for example the rotation angle may be determined in dependence upon said orientation.

It is preferred that when the monitoring area is displaced or rotated, an additional change of the variable of the monitoring area does not take place since when a bend is being negotiated or a turn is being made, the same region is to be detected by evaluated for dangers as when the vehicle combination is traveling in a straight line. In order to achieve this, the monitoring area is specified in such a manner that the monitoring area fits into the detection region without adjusting the size of said monitoring area both when the vehicle combination is traveling in a straight line as well as when the vehicle combination is negotiating an arbitrary bend or making an arbitrary turn. As a consequence, the complexity of the adjustment may be reduced since no additional adjustments and calculations are to be implemented. Simultaneously, a largest possible region of the vehicle environment may be detected.

Alternatively, the monitoring area may also be optimized for traveling in a straight line in other words the actually relevant region for traveling in a straight line is entirely covered. If a situation then occurs in which, owing to the displacement or rotation of the monitoring area as a consequence of a steering movement, regions of the monitoring area drop out of the detection region, in other words the monitoring area exceeds the detection region in regions, the monitoring area is (unavoidably) reduced by these regions. As a consequence, the variable of the monitoring area is not actively changed but if it is changed at all then only an unavoidable adjustment is made to the monitoring area as a consequence of the detection region being exceeded.

In accordance with FIG. 1, a commercial vehicle combination 1 comprising a towing vehicle 2 and a trailer 3 is illustrated schematically. The commercial vehicle combination 1 is only illustrated in an exemplary manner as a semi-truck having a semi-trailer as a trailer 3, said semi-trailer being pivotably connected via a king pin 4 to the semitrailer truck. However, for example drawbar trailers are also relevant. In general, the method in accordance with the invention may be used in the case of commercial vehicle combinations 1 in which the associated trailer 3 changes its orientation with respect to the towing vehicle 2 during a specific traffic situation, by way of example when negotiating a bend K (cf. FIG. 2 and FIG. 4) or while making a turn A (cf. FIG. 3).

The orientation between the towing vehicle 2 and the trailer 3 is caused by means of a turning angle at the towing vehicle 2 and/or as a consequence of a trailer steering arrangement. In other words, the orientation may be characterized—as illustrated in the FIGS. 2 to 4—by means of a prevailing steering angle $\omega$ or else by means of a prevailing articulation angle $\delta$ between the towing vehicle 2 and the trailer 3. In this case, it is assumed that when a bend is negotiated K or when a turn is made A with a specific steering angle $\omega$ after some time a specific maximum orientation is also set between the towing vehicle 2 and the trailer 3, in other words an articulation angle $\delta$ that may be set as maximum in the case of continuing movement of the commercial vehicle combination 1 with the constant steering angle $\omega$.

The commercial vehicle combination 1 comprises in accordance with FIG. 1 a monitoring system 10 that monitors the vehicle environment U at least in regions for objects that enter into or are already located in said vehicle environment. In particular, the region of the vehicle environment U to the side of the commercial vehicle combination 1 is monitored. The monitoring system 10 is embodied so as to classify objects that are located in the monitored region as critical objects O with regard to a potential collision with the associated commercial vehicle combination 1, wherein this takes place by way of example by means of comparing a predicted trajectory of an object that is detected to the predicted trajectory of the associated commercial vehicle combination 1 and a collision probability W is determined therefrom. If intersections occur, as is indicated by way of example in FIG. 3 for the critical object O, which moves toward the commercial vehicle combination 1 when making a turn A, a collision cannot be ruled out and the driver is accordingly warned and/or an automated braking procedure is introduced for the commercial vehicle combination 1 since the probability of collision K is high.

As a consequence, in specific traffic situations the driver may be warned as to whether critical objects O that are approaching the associated commercial vehicle combination 1 are in the monitored region of the vehicle environment U, in particular when negotiating a bend K or when making a turn A, said critical objects being for example other vehicles, cyclists or pedestrians with which it is not possible to at least rule out a collision.

The field of view of the driver to the side may be additionally expanded to a, where applicable, side mirror by means of the monitoring system 10 depending upon the monitored region of the vehicle environment U since by way of example critical objects O may be detected in a so-called "blind spot" which the driver cannot see in the side mirror. The monitoring system 10 may also be used as support during such traffic situations in which the driver must concentrate on something else and therefore by way of example cannot look away from the side mirror that is oriented in the direction of the bend that is being negotiated.

The monitoring system 10 comprises for this purpose— preferably on both sides—a camera 11 that is oriented respectively to the vehicle environment U to the side of the commercial vehicle combination 1 in order to monitor said vehicle environment for critical objects O. The camera 11 may be installed for this purpose on the towing vehicle 2 by way of example in the region of the side mirror that is not illustrated in the figures in order to be able to detect as large a region as possible adjacent to the commercial vehicle combination 1. However, other positions on the towing vehicle 2 are also possible. In accordance with FIG. 4 however by way of example a fastening arrangement on the trailer 3 is also possible in order to be able to monitor the vehicle environment U to the side of the commercial vehicle combination 1 in the direction of the towing vehicle 2. Consequently, a fastening point of the camera 11 may be defined on the towing vehicle 2 or on the trailer 3, wherein the camera 11 during operation is preferably fixed in a non-rotatable manner in relation to this fastening point.

The respective camera 11 of the monitoring system 10 is oriented for this purpose in all variants in such a manner that a detection region 12 of the camera 11 points at least toward the region of the vehicle environment U that is to the side adjacent to the commercial vehicle combination 1. The detection region 12 is only indicated in the figures in an exemplary manner as the crosshatched area. This area may also vary depending upon the scope and type or design of the camera 11 in order to be able to cover a wider region or a wider opened region for the monitoring procedure.

The detection region 12 is defined in such a manner that objects may be theoretically identified in this detection region 12 by means of the respective selected type and lens of the camera 11. In other words, this detection region 12 is specified by means of the selected components of the camera 11 and also the relative position of the camera 11 with respect to the fastening point. The detection region 12 remains the same when the camera 11 is fastened to the towing vehicle 2 relative to the towing vehicle 2. As is illustrated in the FIGS. 2 to 4, however, in the case of a variation of the orientation of the towing vehicle 2 with respect to the trailer 3 while negotiating a bend K or making a turn A, the position of the detection region 12 changes relative to the trailer 3 and also relative to the vehicle environment U. The same applies in accordance with FIG. 4 for the orientation relative to the towing vehicle 2 when the camera 11 is fastened to the trailer 3.

A monitoring area 13 is defined as a part region of the detection region 12 within which objects are also actually detected by the camera 11 and are processed by the monitoring system 10. Accordingly, if an object is located in the vehicle environment U in the possible detection region 12 of the camera 11 but outside the monitoring area 13, this object is not detected by the camera 11 and this object accordingly cannot trigger a warning at this position. Regions of the detection region 12 that are not relevant may thus be excluded for the respective application without it being necessary to adjust the components of the camera 11, in other words in particular the lens of the camera 11. As a consequence, it is possible to avoid processing unnecessary data when the data is analyzed in the monitoring system 10.

This monitoring area 13 is also referred to as the so-called "region of interest" (ROI) and is likewise illustrated in the figures in a crosshatched manner. The monitoring area 13 may be specified by a control device 14 of the monitoring system 10, by way of example by corresponding software on the control device 14.

In the traffic situations that are illustrated in the figures, the monitoring area 13 is specified respectively in such a manner that said monitoring area is oriented to the region of the vehicle environment U to the side of the commercial vehicle combination 1 without the associated towing vehicle 2 and also the associated trailer 3 being in the monitoring area 13. When a bend is being negotiated K or when a turn is being made A, adjustment of the monitoring area 13 by means of a rotation within the detection region 12 about a rotation angle β is provided in order to avoid the associated trailer 3 entering into the monitoring area 13 in the case of the embodiments in FIG. 2 and FIG. 3 or to avoid the associated towing vehicle 2 entering into the monitoring area 13 in the case of the embodiment in FIG. 4 and as a consequence possibly being classified by the monitoring system 10 as a critical object O in the vehicle environment U that is being monitored and to avoid a corresponding warning message being output to the driver. In other words, in this exemplary embodiment a rotation angle β by which the monitoring area 13 is displaced by means of a rotation is provided as an adjustment variable.

In this case, by means of this rotation it is achieved that the associated trailer 3 is no longer detected and the monitoring area 13 is also now oriented to the region of the vehicle environment U that is actually relevant for evaluating the probability of collision W and is therefore to be monitored, in other words the region along the starting traffic lane. This also changes by means of the turning angle of the towing vehicle 2.

This adjustment or rotation of the monitoring area 13 occurs in accordance with the invention by virtue of the fact that the monitoring area 13 is dynamically rotated in dependence upon a variable that describes the orientation between the trailer 3 and the towing vehicle 2. In this case, the rotation is performed proportionally counter to the change in the orientation, in other words counter to the steering movement with the result that the change of the position of the fixedly installed camera 11 relative to the vehicle environment U, said change being caused by means of the steering movement, may be approximately compensated.

The orientation of the trailer 3 relative to the towing vehicle 2 may be characterized by way of example by means of the prevailing steering angle ω while negotiating a bend K or while making a turn A. In addition, a trailer steering arrangement that is possibly present may also be taken into account and said trailer steering arrangement may additionally influence the orientation of the trailer 3 relative to the towing vehicle 2. Alternatively, the prevailing articulation angle δ between the towing vehicle 2 and the trailer 3 may be directly measured and the rotation about the rotation angle β may be specified in dependence upon said articulation angle.

For the simpler case that in the case of a requested steering procedure only the towing vehicle 2 is steered about a specific steering angle ω and the camera 11 is fastened to the towing vehicle 2, a rotation angle β of by way of example the following occurs for the rotation of the monitoring area 13:

$$\beta = arcos\left(\frac{2a^2 + 2ab\sin\left(arccos\left(\frac{b}{a\cot(\omega)}\right)\right)}{2a\sqrt{a^2 + b^2 + 2ab\sin\left(arccos\left(\frac{b}{a\cot(\omega)}\right)\right)}}\right)$$

wherein ω refers to the steering angle, a refers to an axle spacing on the towing vehicle 2 and b refers to a spacing between the king pin 4 and a trailer axle 5. Alternatively, the steering wheel angle α that is provided by means of the steering wheel may also be detected directly, wherein for this purpose in the formula above, the steering angle ω is to be replaced by the term "αL" wherein L refers to a angle scale factor between the steering angle ω and the steering wheel angle α, which is provided by means of the mechanism of the steering ratio.

For the camera 11 that is arranged in FIG. 1 on the right-hand side of the vehicle 1, the above-mentioned formula for the steering angle ω applies for which the following applies:

$$0 < \omega \le \arctan\left(\frac{a}{b}\right)$$

Accordingly, the following applies for the camera 11 on the left-hand side of the vehicle 1:

$$-\arctan\left(\frac{a}{b}\right) \le \omega < 0$$

In this case, it is assumed that when the steering wheel and consequently also the wheels are rotated in the clockwise direction, a positive steering angle ω is set and when the steering wheel is rotated in the counter-clockwise direction, a negative steering angle ω is set. When the threshold values of zero apply in both cases, the vehicle is traveling in a straight line G and for steering angles ω less than zero in the case of a camera 11 on the right-hand side and greater than zero in the case of a camera 11 on the left-hand side, a rotation is not necessary since the trailer 3 cannot move into the monitoring region 13 since the vehicle combination is steered into the respective other direction. At the upper threshold value (+/−arc tan(a/b)) the trailer 3 is perpendicular with respect to the towing vehicle 2 and for a greater steering angle ω according to the amount while negotiating a bend K or while making a turn A constant articulation angle δ is no longer set with the result that, using this formula, a reliable indication of the adjustment variable or the rotation angle β is no longer possible.

The rotation angle β of the monitoring area 13 is in other words specified in dependence upon the prevailing steering input and also the steering behavior of the commercial vehicle combination 1. This connection that is indicated in the formula above in particular applies for speeds of the vehicle combination 1 of less than 40 km/h and is to be adjusted where appropriate in dependence upon the driving situation since further input variables may influence the steering behavior of the commercial vehicle combination 1, said input variables then also having an effect on the rotation angle β.

The adjustment of the monitoring area 13 via the rotation angle β takes place—as illustrated in the figures—preferably without adjusting the size of the monitoring area 13. In other words, the monitoring area 13 is only rotated within the detection region 12 of the camera 11. For this purpose, the monitoring area 13 is preferably specified with respect to the detection region 12 of the camera 11 in such a manner that a rotation that is not dependent upon size up to a maximum steering angle ω or up to an articulation angle δ of 90° is possible for by way of example making a turn A.

However, in order to not exclude relevant regions, for example when traveling in a straight line G, alternatively it is also possible at articulation angles δ that become smaller, in particular in the region of 90°, to cut out regions which leave the detection region 12 and are part of the monitoring area 13 that remains fixed in size while negotiating a bend or while making a turn since said regions are less relevant for evaluating the probability of collision W in these traffic situations. As a consequence, the monitoring area 13 from the outset, in other words when traveling in a straight line G, may be selected as larger. However, an active adjustment of the size of the monitoring area 13 within the detection region 12 does not take place.

When traveling in a straight line G in accordance with FIG. 1, in other words at a steering angle ω=0° and an articulation angle δ=180°, the monitoring area 13 is accordingly specified in such a manner that the associated trailer 3 and the towing vehicle 2 are not detected. This corresponds to a rotation angle β of the monitoring area 13 of 0°. On that basis, while maintaining the position of the camera 11 and also its detection region 12 in the case of an increasing steering angle ω and decreasing articulation angle δ the monitoring area 13 is rotated about the rotation angle β that results from the formula above, with the result that—as illustrated in the FIGS. 2 to 4—the trailer 3 or the towing vehicle 2 are in fact in the detection region 12 but are no longer in the monitoring area 13. Accordingly, it is not possible for a warning to be output owing to a determined collision with said associated trailer or towing vehicle.

The rotation angle β of the monitoring area 13 is adjusted by means of software that is installed on the monitoring system 10, in particular on its control device 14, the steering angle ω or the steering wheel angle α or the articulation angle δ and also further relevant variables being transmitted to said software by way of example via a CAN bus so as to determine the rotation angle β. However, another variable that describes the orientation between the towing vehicle 2 and the trailer 3 may be transmitted on the basis of which the rotation angle β for the adjustment of the monitoring area 13 is then determined and set in the control device 14.

Figure 2:
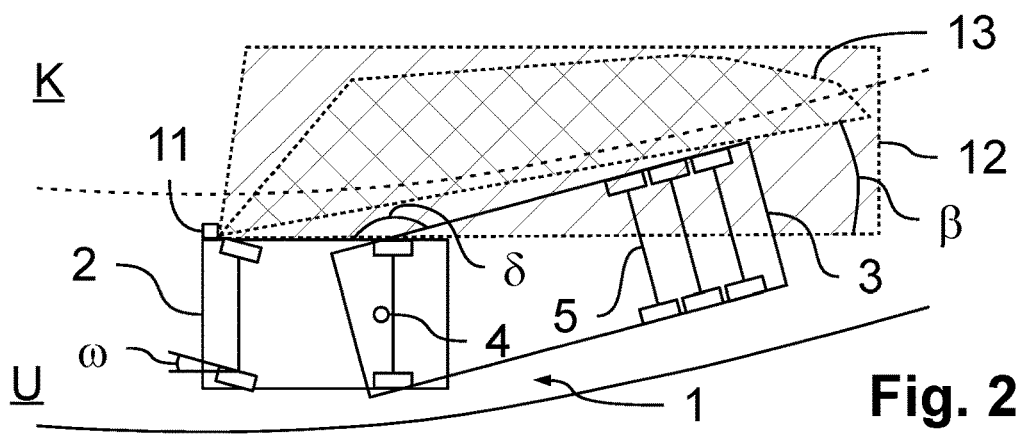
FIG. 2 illustrates the commercial vehicle combination in accordance with FIG. 1 while negotiating a bend.
Figure 3:
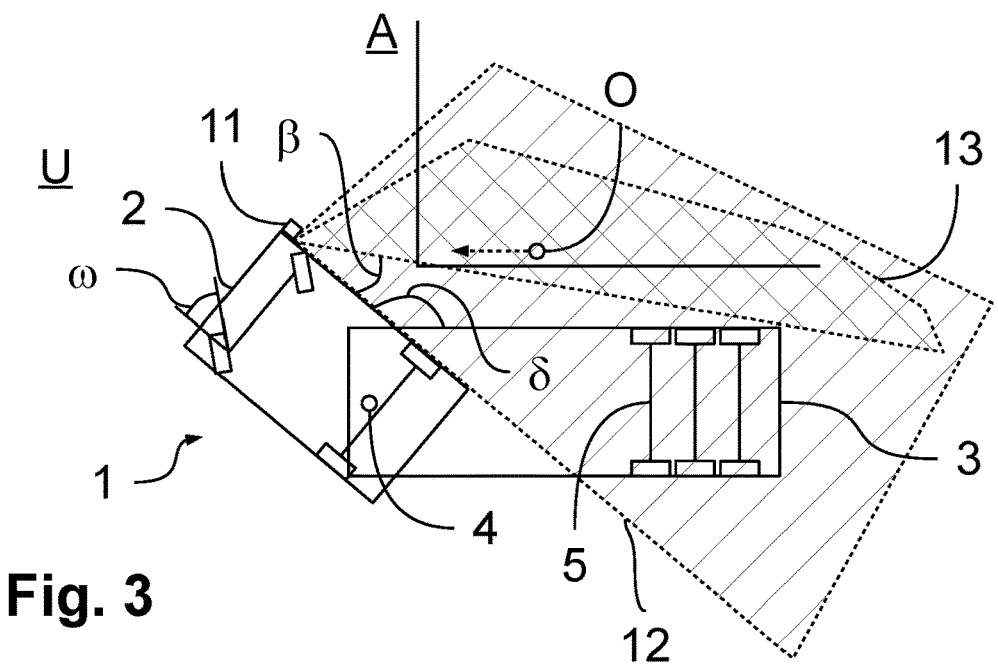
FIG. 3 illustrates the commercial vehicle combination in accordance with FIG. 1 while making a turn.
Figure 4:
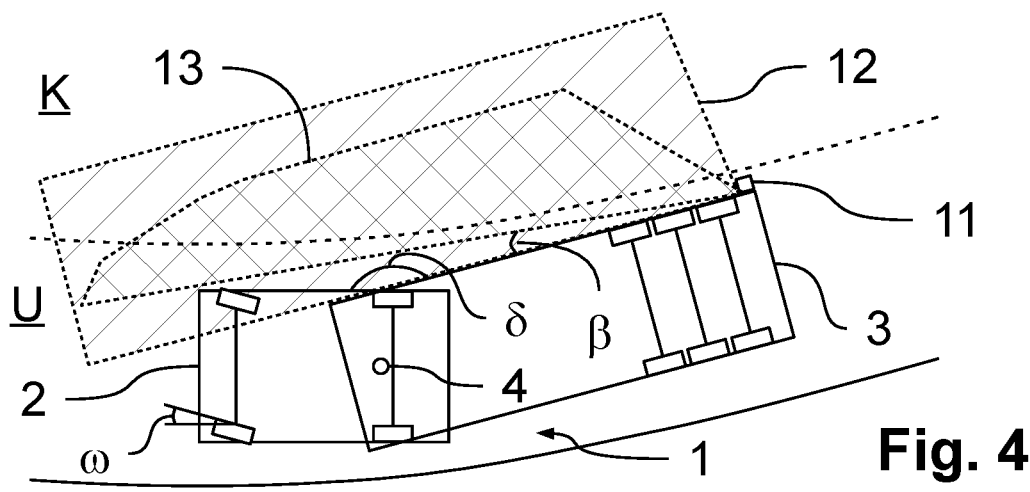
FIG. 4 illustrates the commercial vehicle combination in accordance with FIG. 1 having an alternative arrangement of the monitoring system.

The monitoring system 10 may also monitor the region of the vehicle environment U on the left-hand side adjacent to the commercial vehicle combination 1 in a similar manner to the monitoring arrangements that are illustrated in the FIGS. 2 to 4 in order to also not receive unnecessary warnings from the monitoring system 10 when negotiating a left-hand bend or when making a left-hand turn if the orientation of the trailer 3 changes with respect to the towing vehicle 2.

Figure 5:
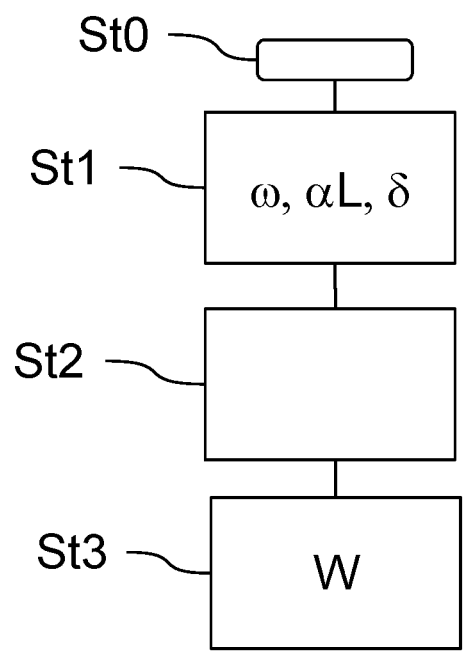
FIG. 5 illustrates a flow diagram for implementing a method in accordance with an embodiment of the invention.

The method in accordance with the invention may be implemented as illustrated in FIG. 5 by way of example in the following manner:

The monitoring system 10 is initialized in a starting step St0. In this case, the monitoring area 13 is specified within the detection region 12 of the camera 11 of the monitoring system 10 in dependence upon predetermined parameters in order to render possible a monitoring procedure that is tailored to the application, by way of example as illustrated in FIG. 1. This monitoring area 13 that is specified is monitored as described above for critical objects O which may create a probability of collision W with the associated commercial vehicle combination 1.

After specifying the monitoring area 13, an orientation of the towing vehicle 2 with respect to the trailer 3 is determined in a first step St1. This is performed by way of example via the steering angle ω, the steering wheel angle α taking into account the angle scale factor L or the articulation angle δ as described above. This information may be selected by the control device 14 of the monitoring system 10 by way of example via the CAN bus or the like.

In a second step St2, a rotation angle β of the monitoring area 13 is calculated and set by the control device 14 from the orientation of the towing vehicle 2 with respect to the trailer 3, in other words the steering angle ω, the steering wheel angle α taking into account the angle scale factor L or from the articulation angle δ. In this case, the rotation angle β is calculated and set as described in such a manner that the monitoring area 13 does not detect the associated trailer 3 or the associated towing vehicle 2 even if these are in the detection region 12 of the camera 11 with the result that said associated trailer and towing vehicle cannot be classified as critical objects O by the monitoring system. The calculation is performed in an exemplary manner in dependence upon the steering angle ω by way of example via the above-mentioned formula.

In a third step St3, it is determined whether critical objects O are within the monitoring area 13, in other words whether a collision with one of the objects that are detected in the monitored region of the vehicle environment U is probable in the prevailing traffic situations G, K, A, in other words a high probability of collision W is created. If this is the case, a warning is output to the driver and/or where applicable an automated engagement into the braking procedure is performed.

In this case, objects are classified as critical if by way of example a probability of collision W is created with reference to their current movement relative to the movement of the associated commercial vehicle combination 1. Since the associated commercial vehicle combination 1 is not in the monitoring area 13 after the above rotation about the rotation angle β both the towing vehicle 2 as well as the trailer 3 cannot be classified as critical objects O even if they are in the detection region 12 of the camera 11.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Commercial vehicle combination
2 Towing vehicle
3 Trailer
4 King pin
5 Trailer axle
10 Monitoring system
11 Camera
12 Detection region
13 Monitoring area
14 Control device
A Making a turn
a Axle spacing of the towing vehicle 2
α Steering wheel angle
b Spacing of the king pin 4 to the trailer axle 5
β Rotation angle/adjustment variable
δ Articulation angle
G Traveling in a straight line
L Angle scale factor
K Negotiating a bend
O Critical objects
U Vehicle environment
W Probability of collision
ω Steering angle
St0, St1, St2, St3 Steps of the method

The invention claimed is:
1. A method for monitoring, using a monitoring system having a camera, a vehicle environment of a vehicle combination including a towing vehicle and a trailer, the method comprising:
specifying a monitoring area within a detection region of the camera, wherein the monitoring system only monitors the monitoring area for critical objects that may create a probability of collision, wherein the monitoring area is specified and oriented in such a manner that the vehicle environment is at least in regions in the monitoring area and simultaneously the vehicle combination is not in the monitoring area;

determining a variable that characterizes an orientation between the towing vehicle and the trailer;

determining an adjustment variable in dependence upon the variable that characterizes the orientation between the towing vehicle and the trailer;

displacing and therefore dynamically adjusting the monitoring area within the detection region using the adjustment variable; and specifying whether critical objects are in the monitoring area so as to avoid a collision between a hazardous object that is in the vehicle environment that is being monitored and the associated vehicle combination.

2. The method as claimed in claim 1, wherein the variable that characterizes the orientation between the towing vehicle and the trailer is a steering angle.

3. The method as claimed in claim 1, wherein the variable that characterizes the orientation between the towing vehicle and the trailer is a steering wheel angle that takes into account an angle scale factor.

4. The method as claimed in claim 1, wherein the variable that characterizes the orientation between the towing vehicle and the trailer is an articulation angle between the towing vehicle and the trailer.

5. The method as claimed in claim 1, wherein the detection region is maintained with respect to a fastening point of the camera on the vehicle combination if the monitoring area is displaced by the adjustment variable.

6. The method as claimed in claim 1, wherein the monitoring area is displaced within the detection region without altering a size of the monitoring area, wherein the monitoring area is specified for this purpose in such a manner that the monitoring area fits in the detection region without adjusting the size of the monitoring area both when traveling in a straight line as well as when negotiating an arbitrary bend or when making an arbitrary turn.

7. The method as claimed in claim 1, wherein the monitoring area is additionally specified within the detection region in such a manner that when traveling in a straight line the monitoring area is entirely in the detection region and when the monitoring area is displaced by the adjustment variable the monitoring area is reduced in size by the regions that are no longer within the detection region when negotiating a bend or making a turn as a result of the displacement of the monitoring area by the adjustment variable.

8. The method as claimed in claim 1, wherein the monitoring area is oriented to the vehicle environment to a side of the associated vehicle combination in this case without detecting the associated vehicle combination.

9. The method as claimed in claim 1, wherein the adjustment variable is proportionally counter to the variable that characterizes the orientation between the towing vehicle and the trailer so as to compensate an orientation of the camera, which has changed relative to the vehicle environment as a consequence of a change in the orientation between the towing vehicle and the trailer.

10. The method as claimed in claim 1, wherein the adjustment variable is a rotation angle about which the monitoring area is rotated within the detection region in dependence upon the variable that characterizes the orientation between the towing vehicle and the trailer.

11. A monitoring system for a vehicle combination comprising a towing vehicle and a trailer, the monitoring system comprising:

a camera having a detection region, wherein a monitoring area is arranged within the detection region, a control device configured to:

monitor the monitoring area for critical objects that may create a probability of collision, specify or change the monitoring area in such a manner that the vehicle environment is at least in regions in the monitoring area and the vehicle combination, on which the monitoring system is arranged, is not in the monitoring area, determine a variable that characterizes an orientation between the towing vehicle and the trailer; and determine and set an adjustment variable of the monitoring area within the detection region in dependence upon the variable that characterizes the orientation between the towing vehicle and the trailer.

12. A vehicle combination comprising a towing vehicle and a trailer having a monitoring system as claimed in claim 11, wherein the monitoring area is oriented to the vehicle environment to a side of the associated vehicle combination.

13. The vehicle combination as claimed in claim 12, wherein the camera is fastened to the towing vehicle or to the trailer in a non-rotatable manner.

* * * * *